Nov. 23, 1926.
G. O. SHELER
1,608,439
TRICYCLE AND WAGON
Filed June 18, 1926
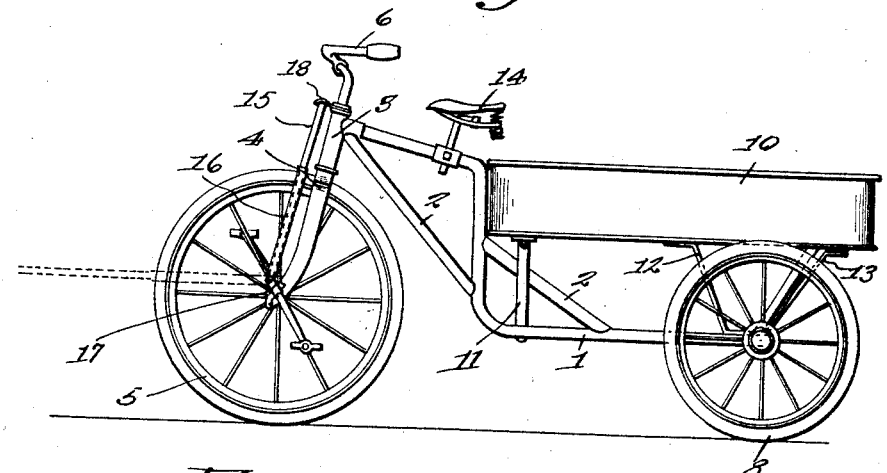
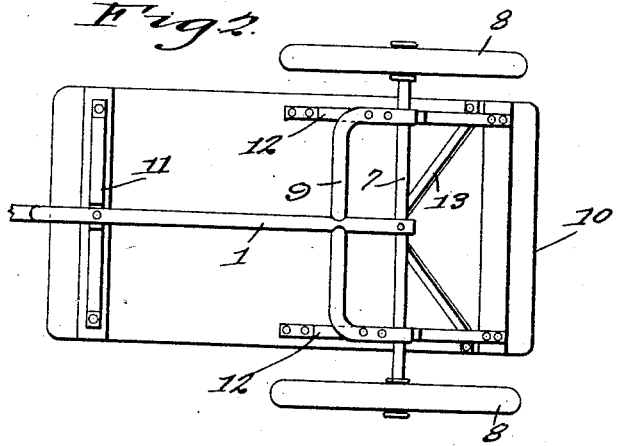
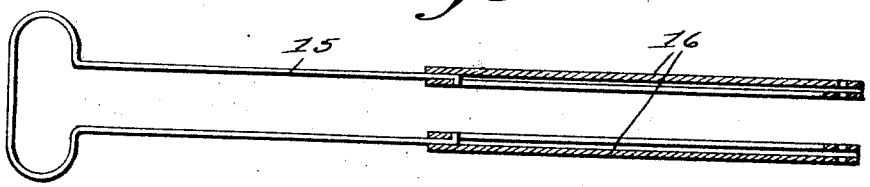
WITNESS: R. A. Thomas
G. O. Sheler INVENTOR
BY Victor J. Evans ATTORNEY Patented Nov. 23, 1926.

1,608,439

UNITED STATES PATENT OFFICE.

GEORGE O. SHELER, OF ELKHART, INDIANA.

TRICYCLE AND WAGON.

Application filed June 18, 1926. Serial No. 116,976.

This invention relates to a combined tricycle and wagon, the general object of the invention being to so construct the tricycle that a small wagon body may be placed on the rear thereof so that the rider of the tricycle can carry a passenger in the wagon or articles of various kinds.

A further object of the invention is to provide the tricycle with a handle so that it can be pulled along when desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the device.

Figure 2 is a bottom plan view of portion thereof.

Figure 3 is an enlarged sectional view through the telescopic handle.

In these views, 1 indicates the central bar of the frame of the tricycle, said bar comprising a horizontal rear portion, a vertical central portion and an upwardly sloping front portion, these portions being connected together by the braces 2 and the front portion being connected with the tubular member 3 which carries the front fork 4, the prongs of which form the bearings for the front wheel 5, and has the handle bar 6 connected with its upper end. The rear end of the rear part of the bar 1 is connected with the rear axle 7 to which the rear wheels 8 are rotatably connected. Angle shaped arms 9 are connected with the rear part of the bar 1 and also engage the axle 7. The body of the wagon is shown at 10, and said body is supported on the rear part of the tricycle frame by the front bracket 11 and the rear brackets 12 and 13. The top of the body is substantially flush with the junction of the forward portion of the frame 1 with the vertical portion thereof and the seat 13 is carried by the forward portion. A telescopic handle, comprising a substantially U-shaped part 15 and the parts 16 in which said part 15 is guided, is fastened to the front fork by means of the links 17 pivoted to the part 16 and fastened to a part of the front fork 4. A spring latch 18 is carried by the upper end of the tubular part 3 and is adapted to engage the bight of the part 15, when the handle is swung upwardly, to hold the handle in its forward position. As will be seen, the handle straddles the front wheel in both positions.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a tricycle having its frame formed with a low horizontal part, a vertical rear part and an upwardly sloping front part, a wagon body, brackets supporting the same and connected with the rear portion of the tricycle frame, a seat on the upwardly sloping front part of the frame, a tubular part connected with said forward part, a front fork carried by the tubular part, a front wheel carried by the fork, a handle at the upper end of the fork, an axle connected with the rear part of the frame, and wheels carried thereby.

2. A device of the class described comprising a frame including a central bar having a horizontal rear portion, a vertical central portion and an upwardly sloping front portion, a wagon body supported upon the horizontal rear portion with its upper edge substantially flush with the junction of the front portion and vertical portion, traction wheels beneath said wagon body, a steering wheel attached to the outer end of the front portion and a seat mounted upon the front portion at a point adjacent its junction with a vertical central portion.

In testimony whereof I affix my signature.

GEORGE O. SHELER.